United States Patent
Yuan et al.

(10) Patent No.: US 6,926,756 B1
(45) Date of Patent: Aug. 9, 2005

(54) METHOD AND APPARATUS FOR CONTROLLING THE OPERATION OF A SCRUBBER

(75) Inventors: Cheng Mu Yuan, Jhubei (TW); Hour Chin Di, Hsinchu (TW)

(73) Assignee: Macronix International Co. Ltd., Hsinchu (TW)

( * ) Notice: Subject to any disclaimer, the term of this patent is extended or adjusted under 35 U.S.C. 154(b) by 89 days.

(21) Appl. No.: 10/403,673

(22) Filed: Mar. 31, 2003

(51) Int. Cl.[7] .............................................. B01D 53/14
(52) U.S. Cl. ................... 95/19; 95/23; 96/252; 96/253; 110/203
(58) Field of Search ................... 95/1, 19, 23; 96/244, 96/252, 253, 254; 110/185, 186, 188, 189, 110/203

(56) References Cited

U.S. PATENT DOCUMENTS

| | | | | |
|---|---|---|---|---|
| 1,792,590 A | * | 2/1931 | Kirk ............................ | 96/253 |
| 3,364,660 A | * | 1/1968 | Rebours ....................... | 96/254 |
| 3,726,065 A | * | 4/1973 | Hausberg et al. ............. | 96/253 |
| 3,785,126 A | * | 1/1974 | Smitherman .................. | 96/244 |
| 3,967,937 A | * | 7/1976 | Hobbs ........................... | 95/13 |
| 3,993,460 A | * | 11/1976 | Gooch et al. .................. | 95/13 |
| 4,178,158 A | * | 12/1979 | Yoshida et al. ............... | 96/242 |
| 5,531,801 A | * | 7/1996 | Sewell et al. ................. | 96/240 |
| 5,639,430 A | * | 6/1997 | Myers et al. ................. | 422/176 |

FOREIGN PATENT DOCUMENTS

JP          62-23423    *   1/1987

* cited by examiner

Primary Examiner—Frank M. Lawrence
(74) Attorney, Agent, or Firm—Fish & Richardson P.C.

(57) ABSTRACT

A method and system to control the operation of a scrubber, in which, the system includes a valve to control the flow of an exhaust from a tool, a sensor to determine whether the valve is open or closed and a controller to control the operation of the scrubber depending on whether the valve is open or closed.

20 Claims, 3 Drawing Sheets

METHOD AND APPARATUS FOR CONTROLLING THE OPERATION OF A SCRUBBER

TECHNICAL FIELD

This invention relates to chemical waste handling processes, and more particularly to methods and apparatus for efficiently controlling the operation of a scrubber.

BACKGROUND

Scrubbers are used in chemical processes to separate or eliminate compounds and come in several different variations. The wet scrubber can separate impurities out of a gaseous stream by passing a wet scrubbing reagent through the gas to absorb the impurities. Examples of wet scrubbing reagents include lime slurries, sodium hydroxide solutions, bromine, nitric acid, ammonia, and water. The wet scrubber is one of the most common pollution control devices used by industry. It operates on a very simple principle: a polluted gas stream is brought into contact with a liquid so that the pollutants can be absorbed. The dry scrubber operates in a similar manner as the wet scrubber, except that a dry scrubbing reagent is sprayed on the gaseous stream being treated. Examples of dry scrubbing reagents include lime powder and carbon powder. Semi-dry scrubbers are another type of scrubber, and these generally use slurries that are atomized into fine droplets and then sprayed into the gaseous stream. The fine droplets quickly dry out in the high temperature of the scrubber prior to interacting with the gaseous stream. Finally, there are scrubbers that operate as incinerators or flare stacks, where a gaseous stream is mixed with combustible gases and then ignited. Typical combustible materials used here include oxygen and natural gas.

In many chemical processes, gaseous streams to be cleaned or burned are delivered to a scrubber in a non-continuous manner. Despite this fact, scrubbers in most chemical processes are continuously operated even when there are no gaseous streams to be treated. This results in an excess consumption and waste of scrubbing reagents or combustible materials, such as oxygen and natural gas, when the scrubber is simply running while waiting for a gaseous stream to arrive. Furthermore, since water (e.g., recycled city water) is often used by most scrubbers to remove by-products of the scrubbing process, water is also wasted when there is no gaseous stream to treat. Accordingly, better methods of scrubbing gaseous streams are desired.

SUMMARY

In one implementation of the invention, a system to control the operation of a scrubber includes a valve that is used to control the flow of an exhaust stream from a tool, a sensor to determine whether the valve is open or closed, and a controller to control a burning status of the scrubber depending on whether the valve is open or closed. The sensor can be a pressure sensor that is configured to detect the flow of the exhaust. For instance, the valve can be operated by a pneumatic line, and the pressure sensor can be located in the pneumatic line to detect pressure changes. This enables the pressure sensor to detect when the valve is opening or closing. The also enables the pressure sensor to determine to what degree the valve is open or closed. The pressure sensor can be any of a wide variety of sensors, including but not limited to electrical sensors and hydraulic sensors. Similarly, the scrubber that is being controlled can be any type of scrubber, such as a wet scrubber, a dry scrubber, or an incinerator.

In another implementation of the invention, a system to control the operation of a scrubber includes a valve to control the flow of an exhaust stream from a tool, a sensor to determine the operating status of the valve, and a controller to control the operation of the scrubber depending on the operating status of the valve. Sensing the operating status of the valve allows the system to know to what degree the valve is open. This information enables the system to control the scrubber in a more efficient manner. The scrubber can be operated at a level that accommodates only the amount of exhaust permitted by the valve. For instance, if the valve is fifty-percent open, the scrubber can be operated at a level that is fifty-percent of the level required when the valve is fully open. This conserves energy, as well as the scrubbing reagents and/or the combustible materials used by the scrubber.

In yet another implementation of the invention, a method for operating a scrubber in accordance with the invention includes detecting a movement of an exhaust stream towards the scrubber, and activating the scrubber based on the detected movement. The process of detecting a movement of the exhaust stream can be carried out by detecting the opening of a valve that controls the exhaust stream flow. If the valve is pneumatically actuated, the system can detect the opening of the valve by detecting a pressure change in an air supply line that actuates the valve. The system can also detect to what degree the valve is open, thereby enabling the system to adjust the operation of the scrubber to conserve energy and scrubbing materials. When the exhaust stream flow terminates, this end can be detected and the system can deactivate the scrubber. One method of detecting the end of the exhaust stream is to detect the closing of the valve that controls the movement of the exhaust stream towards the scrubber. Detecting the closing of the valve can also be done by detecting a pressure change in the air supply line that actuates the valve.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols in the various drawings indicate like elements.

DETAILED DESCRIPTION

The invention provides methods and apparatus for scrubbing gaseous and/or liquid streams while conserving energy, scrubbing reagents, and combustible materials. As used herein, the term "scrubbing components" will be used to generally refer to all materials used by any type of scrubber to treat an exhaust or waste stream. For wet and dry scrubbers, scrubbing components include scrubbing reagents, such as the liquids, powders, and slurries used to remove impurities from gaseous and/or liquid streams. For incinerators and flare stack type scrubbers, scrubbing components include the combustible materials, such as oxygen and natural gas, used to incinerate a gaseous and/or liquid stream. These scrubbing components are consumed in a more efficient manner using the methods and apparatus of the invention.

Figure 1:
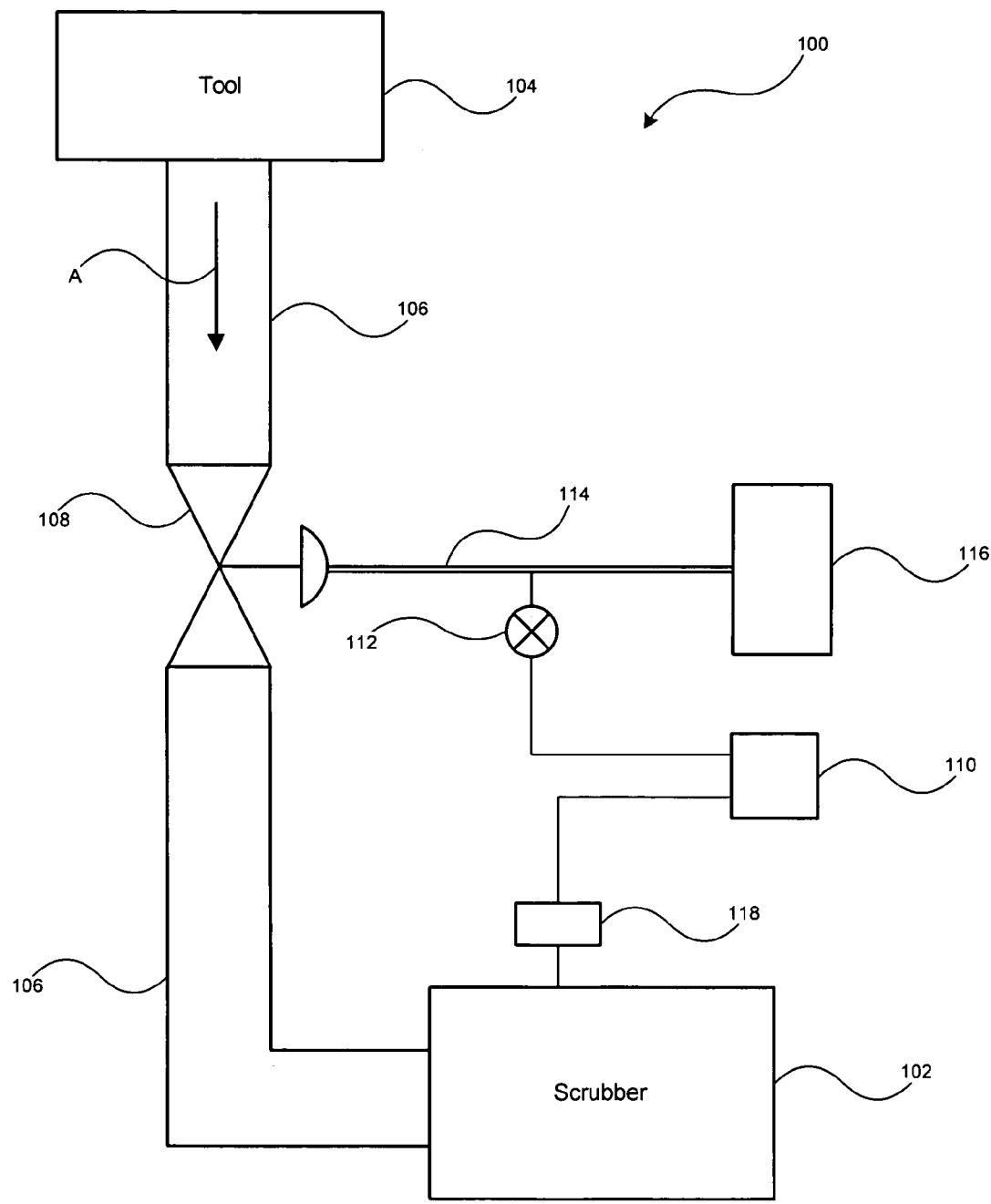
FIG. 1 is a schematic diagram of a chemical processing system constructed in accordance with an implementation of the invention.

FIG. 1 is a diagram of a chemical processing system 100, including a scrubber 102, which is constructed in accordance with an implementation of the invention. System 100 includes a tool 104 that emits an exhaust stream that requires scrubbing. Tool 104 represents any of a number of processes that produce or emit an exhaust stream. The term "process" generally refers to chemical, petrochemical, biochemical, agrochemical, pharmaceutical, food, and mineral processing, as well as any other processes that produce exhaust streams that can feed a scrubber or incinerator. These processes include chemical processes such as rapid thermal processing and chemical vapor deposition. Tool 104 typically includes one or more components, including but not limited to reactors, vessels, pipes, valves, pumps, compressors, heat exchangers, columns, agitators, storage tanks, filters, dryers, blowers, and measuring devices. The exact components included in tool 104 will depend on the particular chemical process that tool 104 carries out.

Tool 104 emits an exhaust stream, represented by arrow "A", that travels through a pipe 106 towards scrubber 102. The exhaust stream can comprise a liquid, a gas, or a mixture of both. A valve 108 is located in pipe 106 to control the flow of the exhaust stream. When valve 108 is open, the exhaust stream can flow through the valve and continue its movement toward scrubber 102. When valve 108 is closed, the exhaust stream is precluded from moving towards scrubber 102 and builds up within pipe 106. There are many different types of valves that can be used for valve 108, including but not limited to gate valves, ball valves, butterfly valves, globe valves, hygienic valves, rotary process valves, solenoid valves, and diaphragm valves. Valve 108 can be actuated, for example, using electric, hydraulic, or pneumatic methods.

System 100 also includes a controller 110 that monitors the status of valve 108 to determine whether it is open or closed. In one implementation, controller 110 can also determine to what degree valve 108 is open. For instance, the degree of openness can be expressed as a percentage, and controller 110 can determine what percentage that valve 108 is open. Accordingly, valve 108 can have a degree of openness that ranges from zero to one hundred percent, where zero percent open indicates valve 108 is closed, fifty percent open indicates valve 108 is half open, and one hundred percent open indicates that valve 108 is fully open.

There are a number of different implementations by which controller 110 can directly or indirectly monitor the status of valve 108. In one implementation, controller 110 can be coupled directly to valve 108 to monitor its status. In another implementation, controller 110 can be coupled to an actuator, such as a hydraulic or an electric actuator, that controls valve 108. In yet another implementation, controller 110 can be coupled to a pressure sensor located in system 100 that enables controller 110 to detect a flow of an exhaust stream within pipe 106, thereby enabling controller 110 to indirectly determine the status of valve 108. In some systems, locating a pressure sensor within pipe 106 can be dangerous due to inaccurate readings caused by interactions between tool 104 and scrubber 102, as well as possible interactions between the exhaust gases and the pressure sensor. Accordingly, it is advantageous to monitor the status of valve 108 be directly monitoring its status or monitoring the mechanism by which valve 108 is actuated.

In the implementation of FIG. 1, controller 110 is coupled to a pressure sensor 112. Pressure sensor 112 is in turn coupled to a pneumatic line 114 that is used by an actuator 116 to operate valve 108. Actuator 116 manipulates the air pressure within pneumatic line 114 to open and close valve 108. A compressed dry air (CDA) flow in pneumatic line 114 can control the operation of valve 108. When the CDA flows through line 114, the valve runs so the exhaust gas can be emitted from tool 104.

In one implementation, actuator 116 can also use pneumatic line 114 to control to what degree valve 108 is open. Pressure sensor 112 measures this air pressure within pneumatic line 114 and provides the information to controller 110. The pressure measurement discloses the status of valve 108, thereby providing controller 110 with information regarding whether valve 108 is open and to what degree.

In another implementation, actuator 116 can use an electrical signal to operate valve 108, and controller 110 can be coupled to an electrical line between actuator 116 and valve 108 to detect the signal. In another implementation, actuator 116 can use a hydraulic signal to operate valve 108, and controller 110 can be coupled to a pressure sensor located in a hydraulic line between actuator 116 and valve 108. The measured fluid pressure within the hydraulic line enables controller 110 to determine the status of valve 108.

Controller 110 is also coupled to a control system 118 for scrubber 102, or alternatively to scrubber 102 itself. Controller 110 can directly or indirectly operate scrubber 102 to place it into an operating status, an idle status, or an off status. When scrubber 102 is in operating status, scrubbing components are fed into a chamber of scrubber 102 to treat an exhaust stream. If the scrubbing components are combustible, such as oxygen and natural gas, then scrubber 102 is also igniting the components.

In one implementation, the operating status of scrubber 102 can range from a fully operating status to a minimally operating status. The operating status of scrubber 102 can have a range to allow it to more efficiently accommodate the amount of exhaust gas and/or liquid that is delivered to scrubber 102. For example, if scrubber 102 is the incinerator type and a minimal amount of exhaust gas is to be incinerated, scrubber 102 can use a minimal amount of combustible materials to perform the scrubbing. Scrubber 102 can vary the amount of scrubbing components used based on the amount of exhaust gas and/or liquid being treated. This prevents scrubber 102 from unnecessarily wasting scrubbing components. Controller 110 can manage where scrubber 102 operates within the operational range.

Figure 2:
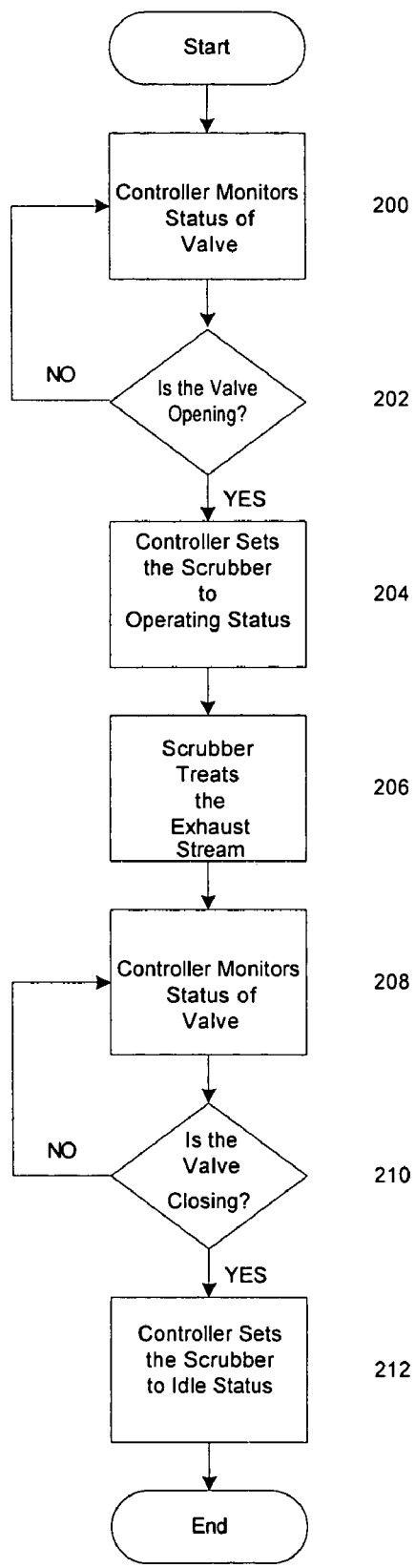
FIG. 2 is a method for operating a scrubber in accordance with an implementation of the invention.

FIG. 2 is a method for operating a scrubber according to an implementation of the invention. In this method, scrubber 102 begins in idle status and the controller is monitoring the status of valve 108 (step 200). When the controller determines that the valve is opening or is open, (the YES branch of step 202), the controller sends a signal to the control system of the scrubber to turn the scrubber on, therefore setting the scrubber to an operating status (step 204). This causes the scrubber to begin operating and scrubbing components are fed into the scrubber. Again, these scrubbing components include wet or dry scrubbing reagents, as well as combustible materials used in incinerators or flare stacks. Otherwise, if the valve is not opening, the controller continues to monitor the status of the valve (the NO branch of step 202).

When valve 108 is open, the exhaust stream passes into the scrubber where it is treated by the scrubbing components, either by being sprayed with a wet or dry scrubbing reagent, or by being mixed with combustible materials and then incinerated (step 206). Next, the controller monitors the valve (step 208) to determine when the valve begins closing to cut off the exhaust stream (step 210). As long as the valve remains open, the controller will continue monitoring the status of the valve (the NO branch of step 210). Once the valve begins closing or is closed (the YES branch of step 210), the controller sends a signal to the control system of the scrubber to set it to an idle status (step 212).

In an alternative implementation, the controller determines to what degree the valve is open and adjusts the operation of the scrubber accordingly. If the valve is only slightly open, thereby permitting just a small exhaust stream to flow towards the scrubber, the controller can adjust the operation of the scrubber to accommodate a minimal flow. Lower quantities of the scrubbing components can be fed into the scrubber to treat the exhaust stream. The controller can deliver adequate amounts of scrubbing components to ensure that the exhaust stream is effectively treated, while minimizing the amount of scrubbing components that are wasted. Likewise, if the controller determines that the valve is fully open, thereby permitting a large exhaust stream to flow towards the scrubber, the controller can adjust the operation of the scrubber to accommodate a large flow. Larger quantities of scrubbing components can be fed into the scrubber to adequately treat the large flow of the exhaust stream.

Figure 3:
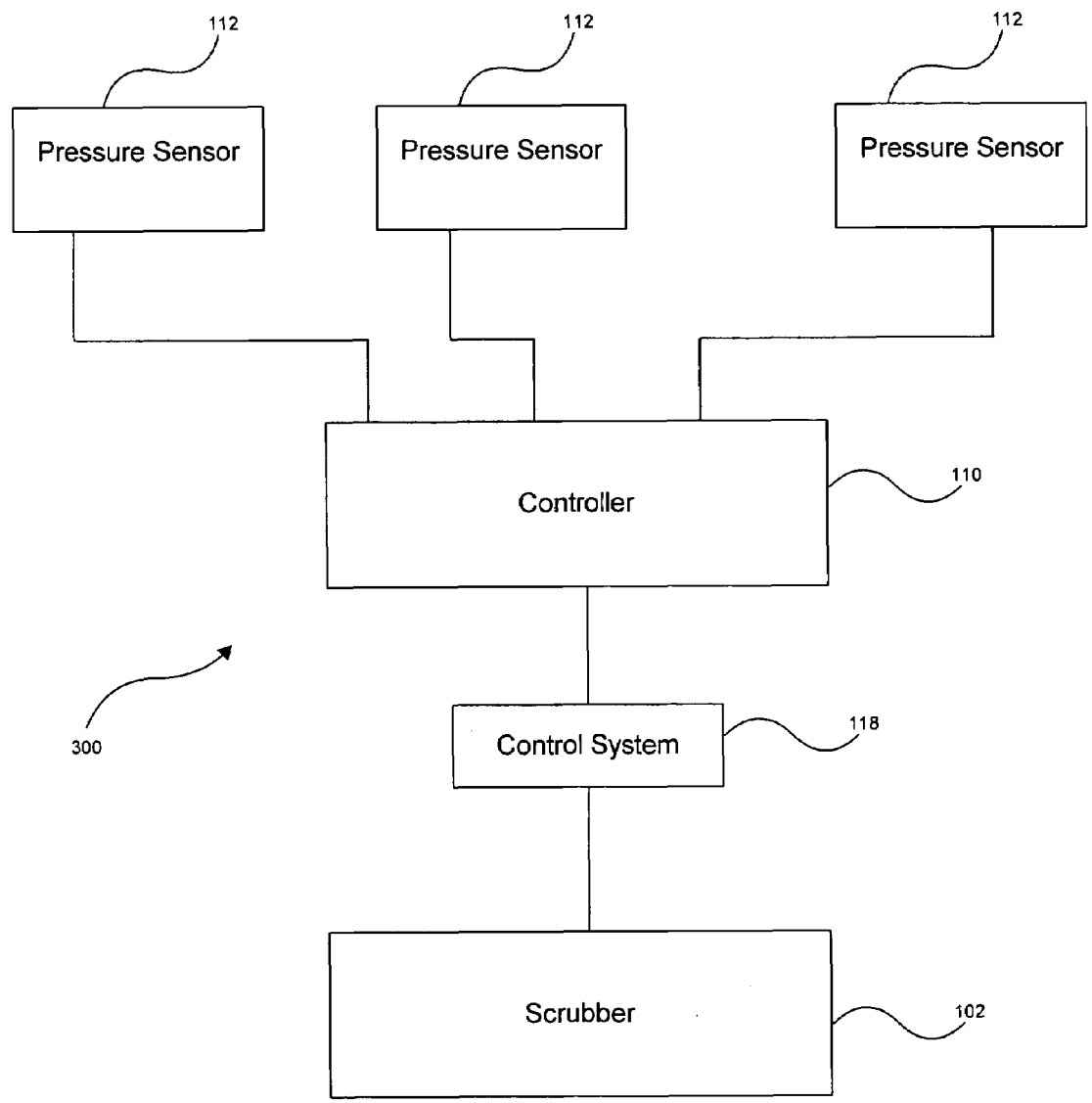
FIG. 3 is a block diagram of a control system implementing the invention.

FIG. 3 is a block diagram of a control system 300 used to carry out one implementation of the invention. Pressure sensors 112 are located throughout a chemical process to monitor valves that control the flow of several exhaust streams from various tools towards scrubber 102. Although three pressure sensors are shown in FIG. 3, any number of pressure sensors can be used, depending on the number of exhaust streams generated. Pressure sensors 112 are coupled to controller 110 to provide information regarding the status of the valves. This enables controller 110 to know which valves are opening and closing, thereby allowing controller 112 to know when exhaust streams are moving towards scrubber 102. Once controller 112 detects one or more exhaust streams moving towards scrubber 102, controller 112 can send a signal to the control system of scrubber 102 to turn scrubber 102 on. As described above, controller 112 can also provide instructions regarding at what level to run scrubber 102, depending on how open the valves are and how large the incoming exhaust streams are. Similarly, controller 110 can receive information regarding when the valves are closing or closed, and can then operate scrubber 102 accordingly.

In one implementation, the invention, or even just the controller, can be implemented in digital electronic circuitry, or in computer hardware, firmware, software, or in combinations of them. The invention can be implemented as a computer program product, i.e., a computer program tangibly embodied in an information carrier, e.g., in a machine-readable readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. For instance, the methods of the invention can be carried out by process control software, including the same process control software that operates the scrubber, the valve, and even the tool. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, the invention can be implemented using mechanical methods. Accordingly, other embodiments are within the scope of the following claims.

What is claimed is:

1. A system to control the operation of a scrubber comprising:
   a valve to control the flow of an exhaust from a tool;
   a sensor to determine whether the valve is open or closed; and
   a controller to control an operation of the scrubber depending on whether the valve is open or closed.

2. The system of claim 1, wherein the sensor comprises a pressure sensor configured to detect the flow of the exhaust.

3. The system of claim 2, wherein the valve is operated by a pneumatic line and the sensor comprises a pressure sensor located in the pneumatic line to detect pressure changes.

4. The system of claim 1, wherein the sensor can determine to what degree the valve is open or closed.

5. The system of claim 1, wherein the scrubber is a wet scrubber.

6. The system of claim 1, wherein the scrubber is a dry scrubber.

7. The system of claim 1, wherein the scrubber is an incinerator.

8. The system of claim 1, wherein the sensor is an electrical sensor.

9. The system of claim 1, wherein the sensor is a hydraulic sensor.

10. A system to control the operation of a scrubber comprising:

a valve to control a flow of an exhaust from a tool;

a sensor to determine an operating status of the valve; and a controller to control an operation of a scrubber depending on the operating status of the valve.

11. The system of claim 10, wherein the sensor comprises a pressure sensor configured to detect the flow of the exhaust.

12. The system of claim 10, wherein the valve is operated by a pneumatic line and the sensor comprises a pressure sensor located in the pneumatic line to detect pressure changes.

13. A method for operating a scrubber comprising:

detecting an opening of a valve that controls a movement of an exhaust stream towards the scrubber; and activating the scrubber based on the detected movement.

14. The method of claim 13, wherein the valve is pneumatically actuated, and detecting the opening of the valve comprises detecting a pressure change in an air supply line that actuates the valve.

15. The method of claim 13, wherein detecting the opening of a valve comprises detecting what degree the valve is open.

16. The method of claim 13, wherein activating the scrubber comprises operating the scrubber at a level that is based at least in part on what degree the valve is open.

17. The method of claim 13, wherein activating the scrubber comprises setting the scrubber to an operating status.

18. The method of claim 13, further comprising:

detecting an end to the movement of the exhaust stream; and deactivating the scrubber based on the detected end of the movement.

19. The method of claim 18, wherein detecting an end comprises detecting the closing of a valve that controls the movement of the exhaust stream towards the scrubber.

20. The method of claim 19, wherein the valve is pneumatically actuated, and detecting the closing of the valve comprises detecting a pressure change in an air supply line that actuates the valve.

* * * * *